United States Patent
Lereya et al.

(10) Patent No.: US 11,436,359 B2
(45) Date of Patent: Sep. 6, 2022

(54) SYSTEM AND METHOD FOR MANAGING PERMISSIONS OF USERS FOR A SINGLE DATA TYPE COLUMN-ORIENTED DATA STRUCTURE

(71) Applicant: Monday.com Ltd., Tel Aviv (IL)

(72) Inventors: Daniel Lereya, Tel Aviv (IL); Roy Mann, Tel Aviv (IL); Eran Zinman, Tel Aviv (IL); Rotem Waisman, Kfar Saba (IL)

(73) Assignee: MONDAY.com Ltd., Tel Aviv (IL)

( * ) Notice: Subject to any disclaimer, the term of this patent is extended or adjusted under 35 U.S.C. 154(b) by 108 days.

(21) Appl. No.: 16/502,679

(22) Filed: Jul. 3, 2019

(65) Prior Publication Data
US 2020/0012808 A1    Jan. 9, 2020

Related U.S. Application Data

(60) Provisional application No. 62/693,949, filed on Jul. 4, 2018.

(51) Int. Cl.
*G06F 16/90* (2019.01)
*G06F 21/62* (2013.01)
(Continued)

(52) U.S. Cl.
CPC ........ *G06F 21/6227* (2013.01); *G06F 16/221* (2019.01); *G06F 16/907* (2019.01); *G06F 21/31* (2013.01); *G06F 2221/2141* (2013.01)

(58) Field of Classification Search
CPC ...... G06F 21/31; G06F 16/221; G06F 16/907; G06F 21/6227
See application file for complete search history.

(56) References Cited

U.S. PATENT DOCUMENTS

| 5,479,602 A | 12/1995 | Baecker et al. |
| 5,517,663 A | 5/1996 | Kahn |

(Continued)

FOREIGN PATENT DOCUMENTS

| CN | 107422666 A | 12/2017 |
| CN | 107623596 A | 1/2018 |

(Continued)

OTHER PUBLICATIONS

Vishal Singh et al., "A Theoretical Framework of a BIM-based Multi-Disciplinary Collaboration Platform", Nov. 5, 2020, Automation in Construction, 20 (2011), pp. 134-144 (Year: 2011).

(Continued)

*Primary Examiner* — Eliyah S. Harper
(74) *Attorney, Agent, or Firm* — Finnegan, Henderson, Farabow, Garrett & Dunner, LLP (57) ABSTRACT

A system and method for managing permissions of users for a column-oriented data structure, including: generating a column oriented data structure in response to receiving a request to generate the data structure from a first user device associated with a first user account, wherein the data structure comprises a plurality of columns, wherein each column is of single data type and is assigned metadata associated with the single data type; associating the first user account with a first set of permissions associated with the generated data structure; and, associating a second user account with a second set of permissions, wherein the first set of permissions comprises at least one additional permission with respect to the second set of permissions.

22 Claims, 5 Drawing Sheets

(51) Int. Cl.
  *G06F 16/907* (2019.01)
  *G06F 21/31* (2013.01)
  *G06F 16/22* (2019.01)

(56) References Cited

U.S. PATENT DOCUMENTS

| | | | |
|---|---|---|---|
| 5,682,469 A | 10/1997 | Linnett | |
| 5,696,702 A | 12/1997 | Skinner et al. | |
| 5,726,701 A | 3/1998 | Needham | |
| 5,787,411 A | 7/1998 | Groff et al. | |
| 5,880,742 A | 3/1999 | Rao et al. | |
| 5,933,145 A | 8/1999 | Meek | |
| 6,016,553 A | 1/2000 | Schneider et al. | |
| 6,023,695 A | 2/2000 | Osborn et al. | |
| 6,167,405 A | 12/2000 | Rosensteel, Jr. et al. | |
| 6,169,534 B1 | 1/2001 | Raffel et al. | |
| 6,185,582 B1 | 2/2001 | Zellweger et al. | |
| 6,195,794 B1 | 2/2001 | Buxton | |
| 6,266,067 B1 | 7/2001 | Owen et al. | |
| 6,275,809 B1 | 8/2001 | Tamaki et al. | |
| 6,377,965 B1 | 4/2002 | Hachamovitch et al. | |
| 6,385,617 B1 | 5/2002 | Malik | |
| 6,460,043 B1 | 10/2002 | Tabbara et al. | |
| 6,496,832 B2 | 12/2002 | Chi et al. | |
| 6,509,912 B1 | 1/2003 | Moran et al. | |
| 6,522,347 B1 | 2/2003 | Tsuji et al. | |
| 6,527,556 B1 | 3/2003 | Koskinen | |
| 6,606,740 B1 | 8/2003 | Lynn et al. | |
| 6,636,242 B2 | 10/2003 | Bowman-Amuah | |
| 6,647,370 B1 | 11/2003 | Fu et al. | |
| 6,661,431 B1 | 12/2003 | Stuart et al. | |
| 7,027,997 B1 | 4/2006 | Robinson et al. | |
| 7,043,529 B1 | 5/2006 | Simonoff | |
| 7,054,891 B2 | 5/2006 | Cole | |
| 7,237,188 B1 | 6/2007 | Leung | |
| 7,249,042 B1 | 7/2007 | Doerr et al. | |
| 7,272,637 B1 | 9/2007 | Himmelstein | |
| 7,274,375 B1 | 9/2007 | David | |
| 7,379,934 B1 | 5/2008 | Forman et al. | |
| 7,383,320 B1 | 6/2008 | Silberstein et al. | |
| 7,415,664 B2 | 8/2008 | Aureglia et al. | |
| 7,461,077 B1 | 12/2008 | Greenwood | |
| 7,489,976 B2 | 2/2009 | Adra | |
| 7,685,152 B2 | 3/2010 | Chivukula et al. | |
| 7,707,514 B2 | 4/2010 | Forstall et al. | |
| 7,710,290 B2 | 5/2010 | Johnson | |
| 7,770,100 B2 | 8/2010 | Chamberlain et al. | |
| 7,827,476 B1 | 11/2010 | Roberts et al. | |
| 7,916,157 B1 | 3/2011 | Kelley et al. | |
| 7,954,064 B2 | 5/2011 | Forstall et al. | |
| 7,970,790 B2 | 6/2011 | Yang et al. | |
| 8,046,703 B2 | 10/2011 | Busch et al. | |
| 8,078,955 B1 | 12/2011 | Gupta | |
| 8,082,274 B2 | 12/2011 | Steinglass et al. | |
| 8,108,241 B2 | 1/2012 | Shukoor | |
| 8,136,031 B2 | 3/2012 | Massand | |
| 8,151,213 B2 | 4/2012 | Weitzman et al. | |
| 8,223,172 B1 | 7/2012 | Miller et al. | |
| 8,286,072 B2 | 10/2012 | Chamberlain et al. | |
| 8,326,814 B2 | 12/2012 | Ghods et al. | |
| 8,365,095 B2 | 1/2013 | Bansal et al. | |
| 8,375,327 B2 | 2/2013 | Lorch et al. | |
| 8,386,960 B1 | 2/2013 | Eismann et al. | |
| 8,423,909 B2 | 4/2013 | Zabielski | |
| 8,543,566 B2 * | 9/2013 | Weissman | G06F 16/2462 707/715 |
| 8,548,997 B1 | 10/2013 | Wu | |
| 8,560,942 B2 | 10/2013 | Fortes et al. | |
| 8,566,732 B2 | 10/2013 | Louch et al. | |
| 8,572,173 B2 | 10/2013 | Briere et al. | |
| 8,578,399 B2 | 11/2013 | Khen et al. | |
| 8,601,383 B2 | 12/2013 | Folting et al. | |
| 8,620,703 B1 | 12/2013 | Kapoor et al. | |
| 8,738,414 B1 | 5/2014 | Nagar et al. | |
| 8,812,471 B2 | 8/2014 | Akita | |
| 8,819,042 B2 | 8/2014 | Samudrala et al. | |
| 8,862,979 B2 | 10/2014 | Hawking | |
| 8,863,022 B2 | 10/2014 | Rhodes et al. | |
| 8,869,027 B2 | 10/2014 | Louch et al. | |
| 8,937,627 B1 | 1/2015 | Otero et al. | |
| 8,938,465 B2 | 1/2015 | Messer | |
| 8,954,871 B2 | 2/2015 | Louch et al. | |
| 9,007,405 B1 | 4/2015 | Eldar et al. | |
| 9,015,716 B2 | 4/2015 | Fletcher et al. | |
| 9,026,897 B2 | 5/2015 | Zarras | |
| 9,043,362 B2 * | 5/2015 | Weissman | G06F 16/2264 707/791 |
| 9,063,958 B2 * | 6/2015 | Muller | G06F 16/21 |
| 9,129,234 B2 | 9/2015 | Campbell et al. | |
| 9,172,738 B1 | 10/2015 | daCosta | |
| 9,183,303 B1 * | 11/2015 | Goel | G06F 16/2228 |
| 9,239,719 B1 | 1/2016 | Feinstein et al. | |
| 9,244,917 B1 | 1/2016 | Sharma et al. | |
| 9,253,130 B2 | 2/2016 | Zaveri | |
| 9,286,246 B2 | 3/2016 | Saito et al. | |
| 9,286,475 B2 * | 3/2016 | Li | G06F 16/21 |
| 9,292,587 B2 | 3/2016 | Kann et al. | |
| 9,336,502 B2 | 5/2016 | Mohammad et al. | |
| 9,342,579 B2 | 5/2016 | Cao et al. | |
| 9,361,287 B1 | 6/2016 | Simon et al. | |
| 9,367,530 B2 | 6/2016 | Antebi et al. | |
| 9,390,059 B1 | 7/2016 | Gur et al. | |
| 9,424,287 B2 | 8/2016 | Schroth | |
| 9,424,333 B1 | 8/2016 | Bisignani et al. | |
| 9,430,458 B2 | 8/2016 | Rhee et al. | |
| 9,449,031 B2 | 9/2016 | Barrus et al. | |
| 9,495,386 B2 | 11/2016 | Tapley et al. | |
| 9,558,172 B2 | 1/2017 | Rampson et al. | |
| 9,613,086 B1 | 4/2017 | Sherman | |
| 9,635,091 B1 | 4/2017 | Laukkanen et al. | |
| 9,679,456 B2 | 6/2017 | East | |
| 9,727,376 B1 | 8/2017 | Bills et al. | |
| 9,760,271 B2 | 9/2017 | Persaud | |
| 9,794,256 B2 | 10/2017 | Kiang et al. | |
| 9,798,829 B1 | 10/2017 | Baisley | |
| 9,866,561 B2 | 1/2018 | Psenka et al. | |
| 9,870,136 B2 | 1/2018 | Pourshahid | |
| 10,043,296 B2 | 8/2018 | Li | |
| 10,067,928 B1 | 9/2018 | Krappe | |
| 10,078,668 B1 * | 9/2018 | Woodrow | G06F 16/219 |
| 10,176,154 B2 | 1/2019 | Ben-Aharon et al. | |
| 10,235,441 B1 | 3/2019 | Makhlin et al. | |
| 10,255,609 B2 | 4/2019 | Kinkead et al. | |
| 10,282,405 B1 | 5/2019 | Silk et al. | |
| 10,282,406 B2 | 5/2019 | Bissantz | |
| 10,311,080 B2 | 6/2019 | Folting et al. | |
| 10,327,712 B2 | 6/2019 | Beymer et al. | |
| 10,347,017 B2 | 7/2019 | Ruble et al. | |
| 10,372,706 B2 | 8/2019 | Chavan et al. | |
| 10,380,140 B2 | 8/2019 | Sherman | |
| 10,423,758 B2 | 9/2019 | Kido et al. | |
| 10,445,702 B1 | 10/2019 | Hunt | |
| 10,452,360 B1 | 10/2019 | Burman et al. | |
| 10,453,118 B2 | 10/2019 | Smith et al. | |
| 10,474,317 B2 | 11/2019 | Ramanathan et al. | |
| 10,489,391 B1 | 11/2019 | Tomlin | |
| 10,489,462 B1 | 11/2019 | Rogynskyy et al. | |
| 10,496,737 B1 | 12/2019 | Sayre et al. | |
| 10,528,599 B1 | 1/2020 | Pandis et al. | |
| 10,534,507 B1 | 1/2020 | Laukkanen et al. | |
| 10,540,152 B1 | 1/2020 | Krishnaswamy et al. | |
| 10,540,434 B2 | 1/2020 | Migeon et al. | |
| 10,564,622 B1 | 2/2020 | Dean et al. | |
| 10,573,407 B2 | 2/2020 | Ginsburg | |
| 10,628,002 B1 | 4/2020 | Kang et al. | |
| 10,698,594 B2 | 6/2020 | Sanches et al. | |
| 10,706,061 B2 | 7/2020 | Sherman et al. | |
| 10,719,220 B2 | 7/2020 | Ouellet et al. | |
| 10,740,117 B2 | 8/2020 | Ording et al. | |
| 10,747,950 B2 | 8/2020 | Dang et al. | |
| 10,748,312 B2 | 8/2020 | Ruble et al. | |
| 10,754,688 B2 | 8/2020 | Powell | |
| 10,761,691 B2 | 9/2020 | Anzures et al. | |
| 10,795,555 B2 | 10/2020 | Burke et al. | |

(56) References Cited

U.S. PATENT DOCUMENTS

| | | |
|---|---|---|
| 10,817,660 B2 | 10/2020 | Rampson et al. |
| D910,077 S | 2/2021 | Naroshevitch et al. |
| 10,963,578 B2 | 3/2021 | More et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 2001/0008998 A1 | 7/2001 | Tamaki et al. |
| 2001/0032248 A1 | 10/2001 | Krafchin |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0135558 A1 | 7/2003 | Bellotti et al. |
| 2003/0187864 A1 | 10/2003 | McGoveran |
| 2003/0200215 A1 | 10/2003 | Chen et al. |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0172592 A1 | 9/2004 | Collie et al. |
| 2004/0212615 A1 | 10/2004 | Uthe |
| 2004/0215443 A1 | 10/2004 | Hatton |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0015806 A1 | 1/2006 | Wallace |
| 2006/0031148 A1 | 2/2006 | O'Dell et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0173908 A1 | 8/2006 | Browning et al. |
| 2006/0190313 A1 | 8/2006 | Lu |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0250369 A1 | 11/2006 | Keim |
| 2006/0253205 A1 | 11/2006 | Gardiner |
| 2006/0287998 A1 | 12/2006 | Folting et al. |
| 2006/0294451 A1 | 12/2006 | Kelkar et al. |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034314 A1 | 2/2008 | Louch et al. |
| 2008/0052291 A1 | 2/2008 | Bender |
| 2008/0065460 A1 | 3/2008 | Raynor |
| 2008/0077530 A1 | 3/2008 | Banas et al. |
| 2008/0104091 A1 | 5/2008 | Chin |
| 2008/0126389 A1 | 5/2008 | Mush et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0195948 A1 | 8/2008 | Bauer |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0198715 A1 | 8/2009 | Barbarek |
| 2009/0248710 A1 | 10/2009 | McCormack et al. |
| 2009/0276692 A1 | 11/2009 | Rosner |
| 2009/0287704 A1 | 11/2009 | Yang et al. |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287221 A1 | 11/2010 | Battepati et al. |
| 2010/0324964 A1 | 12/2010 | Callanan et al. |
| 2011/0010340 A1 | 1/2011 | Hung et al. |
| 2011/0016432 A1 | 1/2011 | Helfman |

(56) References Cited

U.S. PATENT DOCUMENTS

| | | |
|---|---|---|
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0219321 A1 | 9/2011 | Gonzalez et al. |
| 2011/0225525 A1 | 9/2011 | Chasman et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0079408 A1 | 3/2012 | Rohwer |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1 | 2/2013 | Chazin et al. |
| 2013/0086460 A1 | 4/2013 | Folting et al. |
| 2013/0090969 A1 | 4/2013 | Rivere |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |
| 2013/0238363 A1 | 9/2013 | Ohta et al. |
| 2013/0238968 A1 | 9/2013 | Barrus |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2014/0006326 A1 | 1/2014 | Bazanov |
| 2014/0019842 A1 | 1/2014 | Montagna et al. |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0108985 A1 | 4/2014 | Scott et al. |
| 2014/0109012 A1 | 4/2014 | Choudhary et al. |
| 2014/0115433 A1 | 4/2014 | Berners |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137144 A1 | 5/2014 | Järvenpää et al. |
| 2014/0172799 A1 | 6/2014 | Dorman |
| 2014/0173401 A1 | 6/2014 | Oshlag et al. |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1* | 4/2015 | Torman ............... G06F 16/907 715/745 |
| 2015/0125834 A1 | 5/2015 | Mendoza |
| 2015/0142829 A1 | 5/2015 | Lee et al. |
| 2015/0153943 A1 | 6/2015 | Wang |
| 2015/0169531 A1 | 6/2015 | Campbell et al. |
| 2015/0212717 A1 | 7/2015 | Nair et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0281292 A1 | 10/2015 | Murayama et al. |
| 2015/0295877 A1 | 10/2015 | Roman |
| 2015/0317590 A1 | 11/2015 | Karlson |
| 2015/0324453 A1 | 11/2015 | Werner |
| 2015/0331841 A1 | 11/2015 | Antebi et al. |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0246490 A1 | 8/2016 | Cabral |
| 2016/0253982 A1 | 9/2016 | Cheung et al. |
| 2016/0275150 A1 | 9/2016 | Bournonnais et al. |
| 2016/0299655 A1 | 10/2016 | Migos et al. |

(56) References Cited

U.S. PATENT DOCUMENTS

| | | |
|---|---|---|
| 2016/0321235 A1 | 11/2016 | He et al. |
| 2016/0335302 A1 | 11/2016 | Teodorescu et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0350950 A1 | 12/2016 | Ritchie et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0063722 A1 | 3/2017 | Cropper et al. |
| 2017/0075557 A1 | 3/2017 | Noble et al. |
| 2017/0091337 A1 | 3/2017 | Patterson |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0126772 A1 | 5/2017 | Campbell et al. |
| 2017/0132296 A1 | 5/2017 | Ding |
| 2017/0139874 A1 | 5/2017 | Chin |
| 2017/0139884 A1 | 5/2017 | Bendig et al. |
| 2017/0140047 A1 | 5/2017 | Bendig et al. |
| 2017/0153771 A1 | 6/2017 | Chu |
| 2017/0177888 A1 | 6/2017 | Arora et al. |
| 2017/0185668 A1 | 6/2017 | Convertino et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel et al. |
| 2017/0236081 A1 | 8/2017 | Grady Smith et al. |
| 2017/0242921 A1 | 8/2017 | Rota |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0324692 A1 | 11/2017 | Zhou |
| 2017/0351252 A1 | 12/2017 | Kleifges et al. |
| 2017/0372442 A1 | 12/2017 | Mejias |
| 2018/0025084 A1 | 1/2018 | Conlan et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088989 A1 | 3/2018 | Nield et al. |
| 2018/0089299 A1* | 3/2018 | Collins ............... G06F 16/282 |
| 2018/0095938 A1 | 4/2018 | Monte |
| 2018/0096417 A1 | 4/2018 | Cook et al. |
| 2018/0109760 A1 | 4/2018 | Metter et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1* | 11/2018 | Eberlein ............. G06F 16/2365 |
| 2018/0357305 A1 | 12/2018 | Kinast et al. |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0036989 A1 | 1/2019 | Eirinberg et al. |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1 | 8/2019 | McKenna |
| 2019/0251884 A1 | 8/2019 | Burns et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1* | 1/2020 | Lereya ............... G06F 16/2458 |
| 2020/0026397 A1 | 1/2020 | Wohlstadter et al. |
| 2020/0042648 A1 | 2/2020 | Rao |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0247661 A1 | 8/2020 | Rao et al. |
| 2020/0279315 A1 | 9/2020 | Manggala |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0348809 A1 | 11/2020 | Drescher |
| 2020/0349320 A1 | 11/2020 | Owens |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0084120 A1 | 3/2021 | Fisher et al. |
| 2021/0124749 A1 | 4/2021 | Suzuki et al. |
| 2021/0124872 A1 | 4/2021 | Lereya |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0264220 A1 | 8/2021 | Wei et al. |

FOREIGN PATENT DOCUMENTS

| | | |
|---|---|---|
| CN | 107885656 A | 4/2018 |
| CN | 112929172 A | 6/2021 |
| WO | WO 2004/100015 A2 | 11/2004 |
| WO | WO 2006/116580 A2 | 11/2006 |
| WO | WO 2017202159 A1 | 11/2017 |
| WO | WO 2020/187408 A1 | 9/2020 |

OTHER PUBLICATIONS

Edward A. Stohr et al., Workflow Automation: Overview and Research Issues, 2001, Information Systems Frontiers 3:3, pp. 281-296 (Year: 2001).

International Search Report and Written Opinion of the International Search Authority in PCT/IB2021/000297, dated Oct. 12, 2021 (20 pages).

Dapulse.com "features".extracted from web.archive.or/web/2014091818421/https://dapulse.com/features; Sep. 2014 (Year: 2014).

(56) References Cited

OTHER PUBLICATIONS

Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).

Isaiah Pinchas Kantorovitz, Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

Sajjad Bahrebar et al., "A Novel Type-2 Fuzzy Logic for Improved Risk Analysis of Proton Exchange Membrane Fuel Cells in Marine Power Systems Application", *Energies*, 11, 721, pp. 1-16, Mar. 22, 2018.

D'Elessio et al., Monday.com Walkthrough 2018\All Features, Platforms & Thoughts, Mar. 1, 2018, pp. 1-55, 2018.

Rordigo et al., Project Management with Monday.com: a 101 Introduction; Jul. 22, 2019, pp. 1-21, 2019.

International Search Report and Written Opinion of the International Searching Authority in PCT/IB2020/000658, dated Nov. 11, 2020 (12 pages).

International Search Report and Written Opinion of the International Searching Authority in PCT/IB2020/000974, dated May 3, 2021 (19 pages).

ShowMyPC, "Switch Presenter While Using ShowMyPC"; web.archive.org; Aug. 20, 2016.

International Search Report and Written Opinion of the International Searching Authority in PCT/IB2020/000024, dated May 3, 2021 (13 pages).

"Pivot table—Wikipedia"; URL: https://en.wikipedia.org/w/index.php?title=Pivot_table&oldid=857163289, originally retrieved on Oct. 23, 2019; retrieved on Jul. 16, 2021.

International Search Report and Written Opinion of the International Searching Authority in PCT/IB2021/000090, dated Jul. 27, 2021 (16 pages).

\* cited by examiner

| Projects | Manager | Manager's Position | Reference | Design | International Phone Number |
|---|---|---|---|---|---|
| Project A | Dan | VP R&D | AAA-001 | Done | +1-973-777-5555 |
| Project B | Ron | Project Manager | AAA-002 | Working on it | +1-973-777-4444 |
| Project C | Mike | Product Manager | AAA-003 | Working on it | +1-973-777-3333 |

FIG. 5

SYSTEM AND METHOD FOR MANAGING PERMISSIONS OF USERS FOR A SINGLE DATA TYPE COLUMN-ORIENTED DATA STRUCTURE

CROSS-REFERENCE TO RELATED APPLICATIONS

This application claims the benefit of U.S. Provisional Application No. 62/693,949 filed on Jul. 4, 2018, the contents of which are hereby incorporated by reference.

TECHNICAL FIELD

The present disclosure relates generally to column-oriented data structures analysis and more particularly, to a system and method thereof for managing permissions of users for a column-oriented data structure.

BACKGROUND

In today's world large enterprises, as well as small and medium-size enterprises, must deal with the challenge of managing their operations. The task of managing operations may be complicated and time consuming. In many cases, managing operations of a single project requires integration of several employees, departments, and the like of the entity.

In order to deal with this complicated and time-consuming task, many entities use different project management software applications. These software applications allow for the organizing, planning and managing of resources in order to optimize the time and resources spent on each project. Some of these software applications can manage estimation and planning, scheduling, cost control and budget management, communication, decision making, and so on.

One of the most valuable features of management applications is the ability to provide information regarding one or more projects in real time. Such information may include, for example, an overview on how long tasks will take to complete, early warnings of any risks to the project, historical information on how projects have progressed, how actual and planned performance are related, cost maintenance, and the like. Many currently available applications lack the ability to provide such real time data in an efficient and organized manner. Additionally, many such applications fail to provide effective user permission control to allow for the sharing of management information with multiple users while limiting certain actions to one or more users. Lastly, many available spreadsheet programs that can be used for task management assign metadata for each individual cell, which creates significant overhead when storing large datasets.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for managing permissions of users for a column-oriented data structure, including: a method for managing permissions of users for a column-oriented data structure, including: generating a column oriented data structure in response to receiving a request to generate the column-oriented data structure from a first user device associated with a first user account, wherein the column-oriented data structure includes a plurality of columns, wherein each column is of single data type and is assigned metadata associated with the single data type; associating the first user account with a first set of permissions associated with the generated data structure; and, associating a second user account with a second set of permissions, wherein the first set of permissions comprises at least one additional permission with respect to the second set of permissions, and wherein both the first user account and the second user account can access the column-oriented data structure at the same time, each according to their associated permissions.

Certain embodiments disclosed herein also include a non-transitory computer readable medium having stored thereon instructions for causing a processing circuitry to perform a process, the process including: generating a column oriented data structure in response to receiving a request to generate the column-oriented data structure from a first user device associated with a first user account, wherein the column-oriented data structure includes a plurality of columns, wherein each column is of single data type and is assigned metadata associated with the single data type; associating the first user account with a first set of permissions associated with the generated data structure; and, associating a second user account with a second set of permissions, wherein the first set of permissions comprises at least one additional permission with respect to the second set of permissions, and wherein both the first user account and the second user account can access the column-oriented data structure at the same time, each according to their associated permissions.

Certain embodiments disclosed herein also include a system for managing permissions of users for a column-oriented data structure, including: a processing circuitry; and a memory, the memory containing instructions that, when executed by the processing circuitry, configure the system to: generate a column oriented data structure in response to receiving a request to generate the column-oriented data structure from a first user device associated with a first user account, wherein the column-oriented data structure includes a plurality of columns, wherein each column is of single data type and is assigned metadata associated with the single data type; associate the first user account with a first set of permissions associated with the generated data structure; and, associate a second user account with a second set of permissions, wherein the first set of permissions comprises at least one additional permission with respect to the second set of permissions, and wherein both the first user account and the second user account can access the column-oriented data structure at the same time, each according to their associated permissions.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed system is a permissions management tool that allows for control of users' ability to view, make changes, and edit single data type column-oriented data structures. After a request for generating the column-oriented data structure is received from a user device that is associated with a first user account, a column-oriented data structure that includes columns of a single data type is generated. The single data type columns may include, for example, numeric columns, alphanumeric columns, percentages columns, images columns, and so on. The first user account is associated with a first set of permissions associated with the generated column-oriented data structure. The system is configured to associate a second set of permissions, that comprise less permissions than the first set of permissions, with a second user.

Figure 1:
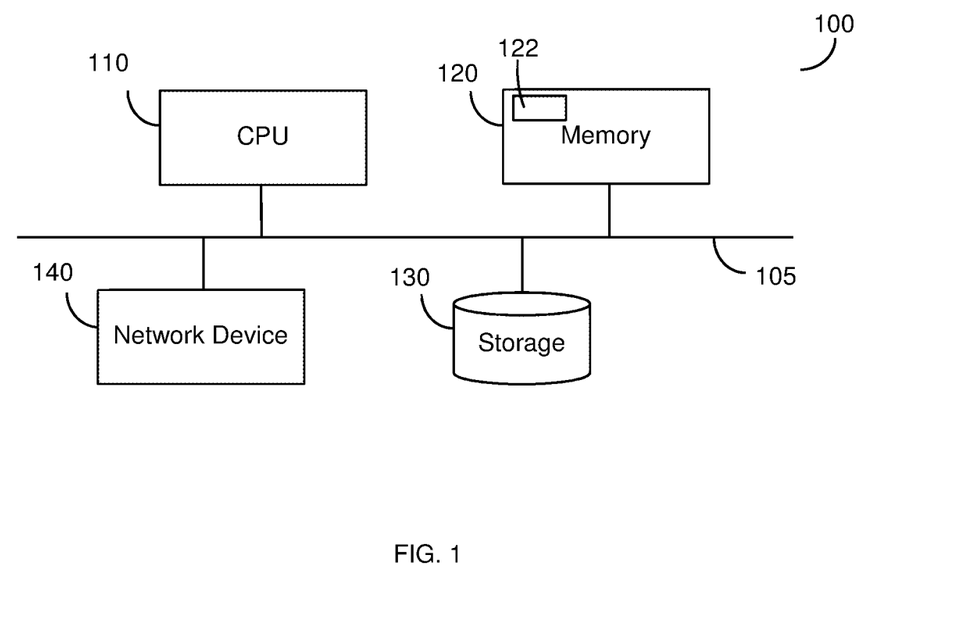
FIG. 1 is a block diagram of a computing device for managing permissions of users for a single data type column-oriented data structure according to an embodiment.

FIG. 1 shows an exemplary and non-limiting block diagram of a computing device 100 for managing permissions of users for single data type column-oriented data structures according to an embodiment. The computing device 100 includes at least one processing element 110, for example, a central processing unit (CPU) or similar processing circuitry. In an embodiment, the processing unit 110 includes, or is a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The CPU 110 is coupled via a bus 105 to a memory 120.

The memory 120 further includes a memory portion 122 that contains instructions that, when executed by the processing element 110, performs the method described in more detail herein. The memory 120 may be further used as a working scratch pad for the processing element 110, a temporary storage, and others, as the case may be. The memory 120 may be a volatile memory such as, but not limited to random access memory (RAM), or non-volatile memory (NVM), such as, but not limited to, flash memory. The processing element may be further connected to a network device 140, such as a network interface card, for providing connectivity between the computing device 100 and a network, such as a network 210 discussed in more detail with respect to FIG. 2. The processing element 110 may be further connected a storage 130. The storage 130 may be used for the purpose of storing single data type column-oriented data structures, data elements associated with the data structures, and so on.

The processing element 110 or the memory 120 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing element 110 to perform the various functions described in further detail herein.

Figure 2:
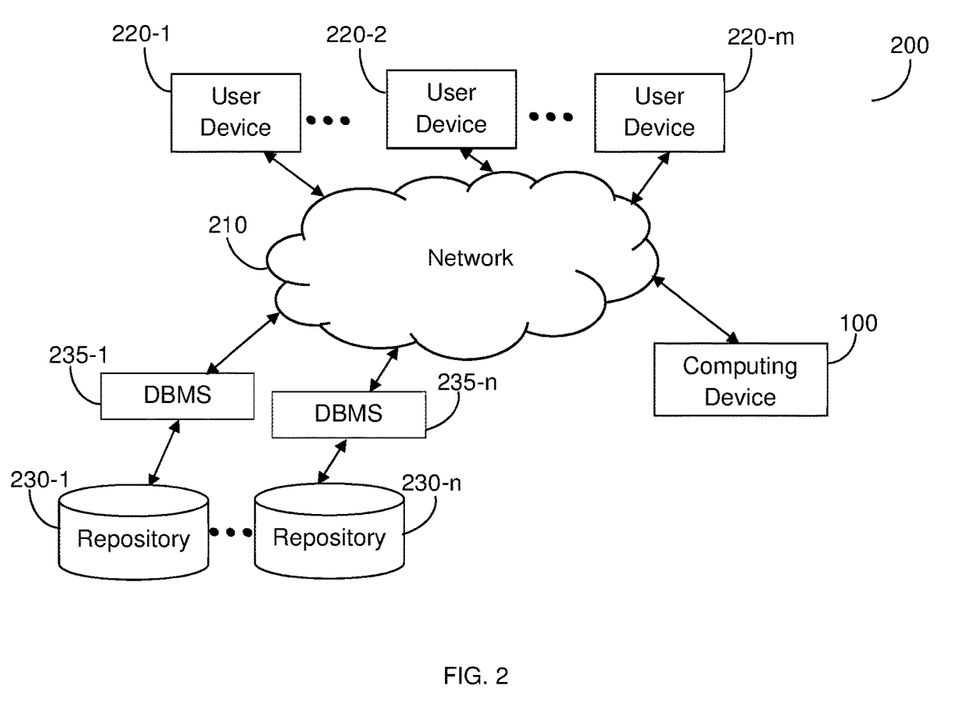
FIG. 2 is a network diagram of a computing architecture utilized to describe the various embodiments disclosed herein.

FIG. 2 is a network diagram of a computing architecture 200 utilized to describe the various embodiments disclosed herein. The computing device 100 is connected to the network 210. The computing device 100 and its components are described herein above in more detail with respect of FIG. 1. The network 210 enables communication between different elements that may be connected to the computing device 100, as further described herein below. The network 210 may be the Internet, the world-wide-web (WWW), a local area network (LAN), a wide area network (WAN), a metro area network (MAN), and other networks capable of enabling communication between the elements of the computing architecture 200. In an embodiment, the computing device 100 is a server deployed in a cloud computing environment.

One or more user devices 220-1 through user device 220-m, referred to individually as user device 220 and collectively as user devices 220, may be connected to the computing device 100 via the network 210. A user device 220 may be, for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like. One or more data repositories 230-1 through data repository 230-n, referred to individually as data repository 230 and collectively as data repositories 230, may be connected to the computing device 100 via the network 210, or embedded within the computing device 100. The data repository 230 may be, for example, a storage device containing thereon a database, a data warehouse, and the like, that may be used for storing data structures, data items, metadata, etc., as further described herein below. In some embodiments, one or more of the repositories may be distributed over several physical storage devices, e.g., in a cloud-based computing environment. Any of the storage devices may be a network accessible storage device, or a component of the computing device 100.

According to an embodiment, a request for generating a single data type column-oriented data structure is transferred over the network 210 from a first user device 220-1 and received at the computing device 100. A single data type column-oriented data structure may be a digital data structure of at least a table that includes at least a column where all cells of the at least a column are of a single type. The first user device 220-1 is associated with a first user account. The first user account may be associated with an employee, a manger, a department, etc., of an entity and may require a login using a password in order to send the request to the computing device 100.

In response to receiving the request, the computing device 100 may be configured to generate the column-oriented data structure. The column-oriented data structure includes a plurality of columns. Each column includes a plurality of cells and each column is associated with a single data type. A single data column is one where all cells are uniform in at least one aspect. The aspect may be numeric values only, characters only, alphanumeric values, graphic elements only, closed list of elements, formatting, 1-100 values only, "A" to "E" only, and so on, just to name a few examples.

The computing device 100 is configured to associate the first user account with a first set of permissions associated with the generated column-oriented data structure. The first set of permissions may include, for example, read permission, write permission, a permission to generate a new column-oriented data structure within a schema of data structures, a permission to regenerate a schema, a permission to edit a schema, a permission to edit the data structure, etc. A schema of data structures may include a plurality of arrays of single data type columns. In an embodiment, the first set of permissions associated with the first user account is stored in a data repository 230 using, for example, a database management service (DBMS) 235.

According to one embodiment, the computing device 100 may be configured to receive from the first user device 220-1 a second request for granting access to a second user account, which may be associated with a second user device 220-2, to the generated column-oriented data structure.

The computing device 100 may be configured to associate the at least a second user account associated with a second user device 220-2 with a second set of permissions. The first set of permissions includes at least one additional permission with respect to the second set of permissions. That is to say, the second set of permissions includes less permissions than the first set of permissions. The second set of permissions may include, for example, read permission and write permission only, while the first set of permissions include permission to write, read, change columns' position, change cells' position, and the like. Additionally, in an embodiment both the first user account and the second user account can access the column-oriented data structure at the same time, each according to their associated permissions.

As a non-limiting example, a request for generating a single data type column-oriented data structure is received from a laptop, i.e., a first user device 220-1, associated with a first user account that is associated with a manager of a certain project. The computing device 100 generates the column-oriented data structure in response to receiving the request and associates all the permissions available, such as permissions to read, write, edit, change columns' position, etc., with the specific user account associated with the specific laptop. The computing device 100 then associates a second user account accessing the column-oriented data structure through a second user device 220-2, such as a PC of one of the team members of the project's manager, with permission to only read and write, but not to change any column's position or any other data property, with respect to the generated column-oriented data structure.

According to one embodiment, the second set of permissions may allow certain types of second user accounts to view, and potentially make changes to, certain columns and/or rows of a certain column data structure of the single data type, when other second user accounts may not be able to view the same columns and/or rows of the same data structure. The different set of permissions may be allocated to certain second user accounts based on a predetermined association related to the types of user accounts that are allowed to see certain columns and/or rows. According to another embodiment, the permissions may be changed with respect to the type of the data structure, type of column, type of row, type of user, type of company, a combination thereof, etc. For example, in response to receiving from a first user account related to a certain company a request to generate a first column-oriented data structure having single data type columns, the computing device 100 identifies a second user account that is not associated with the company. Thus, some columns and/or rows of the generated column-oriented data structure are not presented to the second user account although the second user account receives a set of permissions to other portions of the column-oriented data structure. The identification and predetermined permissions may be based on, for example, a user account email address.

Figure 3:
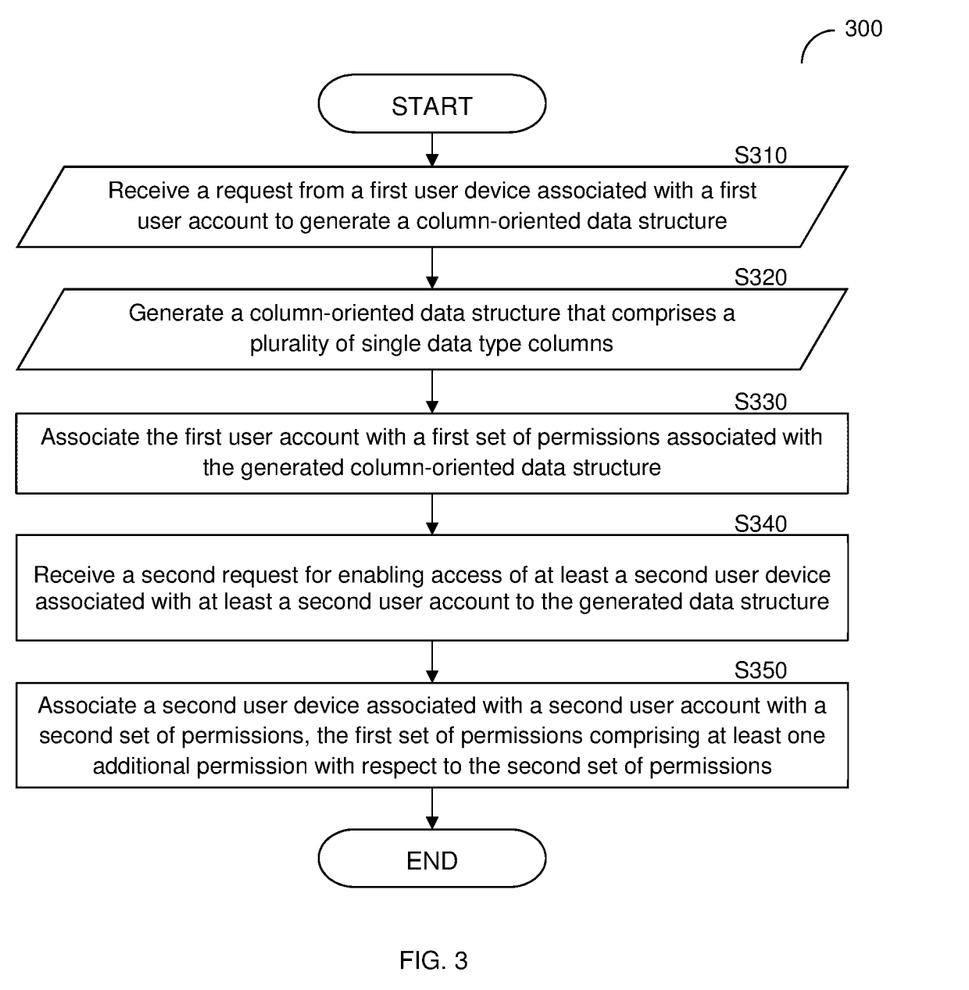
FIG. 3 is an example flowchart describing the operation of a method for managing permissions of users for a single data type column-oriented data structure according to an embodiment.

FIG. 3 is an example flowchart illustrating a method for managing permissions of users for single data type column-oriented data structures according to an embodiment. At S310, a request to generate a column-oriented data structure (hereinafter, a table) that includes a plurality of single data type columns is received from a first user device, e.g., user device 220-1 of FIG. 2, that is associated with a first user account.

At S320, a table that includes a plurality of single data type columns is generated. In an embodiment, the table is defined by data specific columns, where each column is assigned metadata associated with a single data type, allowing for efficient use of resources and reduced processing requirements compared to single cell based databases.

At S330, the first user account is associated with a first set of permissions associated with the generated table that includes a plurality of single data type columns. A single data type column is one where all cells are uniform in at least one aspect. The aspect may be numeric values only, characters only, alphanumeric values, graphic elements only, closed list of elements, formatting, limited range, e.g., 1-100 values only, "A" to "E" only, and so on.

At S340, a second request for enabling access of at least a second user account associated with at least a second user device, e.g., user device 220-2 of FIG. 2, to the generated table is received. In an embodiment, the second request is sent to a computing device by the first user device associated with the first user account.

At S350, a second user account which may be associated with the second user device is associated with a second set of permissions. The first set of permissions includes at least one additional permission with respect to the second set of permissions.

Figure 4:
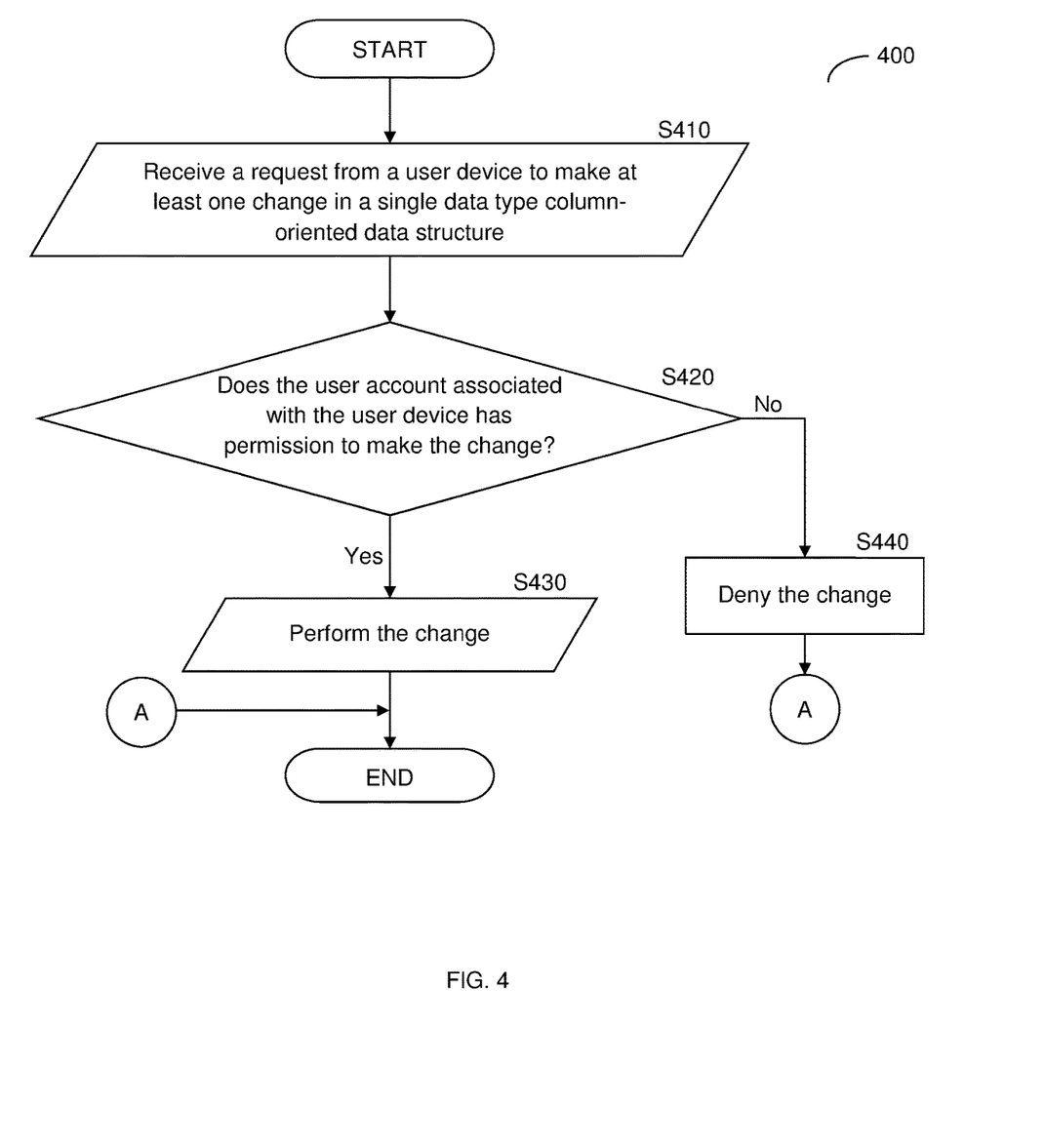
FIG. 4 is an example flowchart illustrating a method for changing permissions of users for a single data type column-oriented data structures according to an embodiment.

FIG. 4 is an example flowchart 400 illustrating a method for changing permissions of users for single data type column-oriented data structures according to an embodiment.

At S410, a request for making at least one change in a single data type column-oriented data structure (hereinafter: a table) is received, e.g., from a user account associated with user device such as user device 220 of FIG. 2. The request may require adding content to one or more cells, changing a cell's array, deleting content, deleting cells, adding single data type columns, and the like.

At S420, it is determined whether the user account associated with the user device has permission to make the change, and if so, execution continues at S430, otherwise; execution continues at S440. The determination may be achieved by searching a data repository in which a set of permissions associated with the table and various users accounts are stored. The set of permissions of the specific table may be indicative of whether the user device has permission to make the desired change. In an embodiment, S420 may further include identifying the required change, the change type, and the like. S420 may also include searching, with respect to the required change type, for a set of permissions associated with the user account associated with the user device from which the request was received, with respect to the specific table. For example, the user account may have all the available permissions. As another example, the user account may have only the permission to read and write, i.e., add content, but not to change the cells' position, columns' position, and the like.

At S430, the change requested by the user account is performed in the column-oriented data structure, e.g., by a computing device.

At S440, in response to determining that the user device does not have permission to make the desired change, the request for a change is denied.

Figure 5:
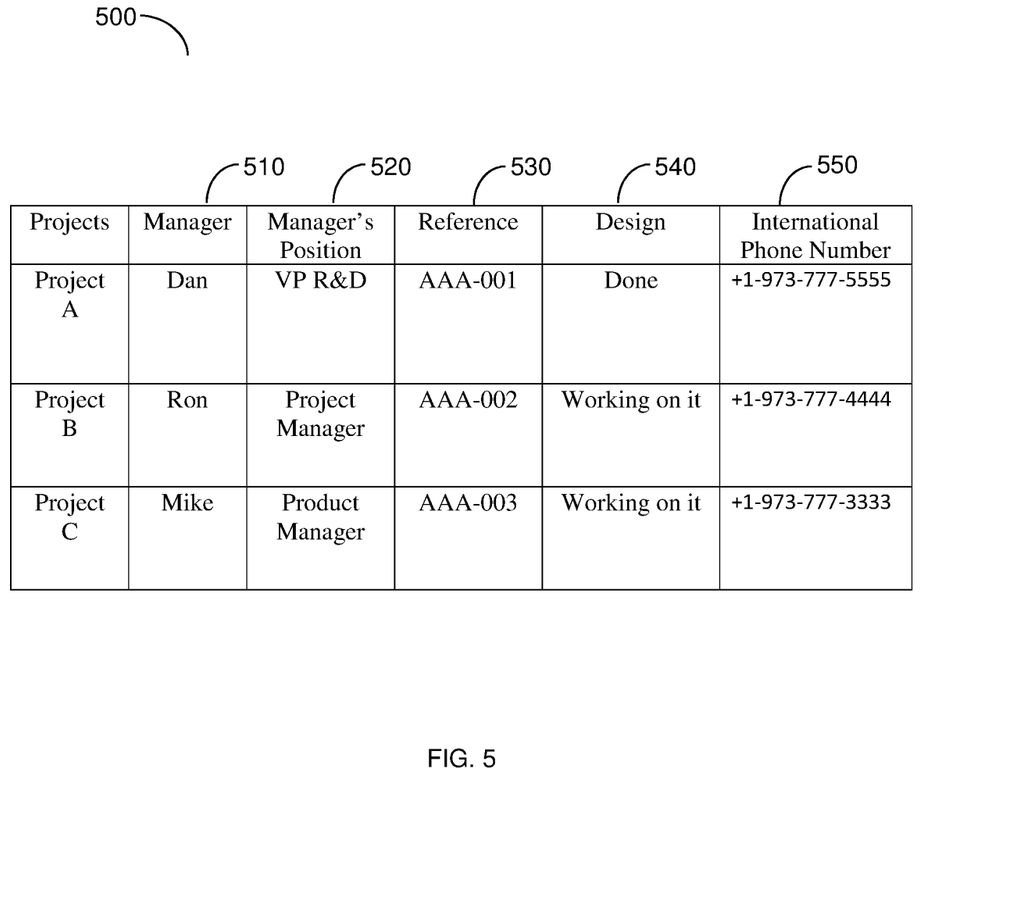
FIG. 5 is a schematic diagram that demonstrates a single data type column-oriented data structure according to an embodiment.

FIG. 5 is an example schematic diagram that demonstrates a single data type column-oriented data structure according to an embodiment. The example single data type column-oriented data structure 500 includes four rows and five columns. All five columns contain cells such that all cells of each column are associated with a single data type (i.e., all cells of the first column are of a first data type, all cells of the second column are of a second data type, an so on). In an embodiment, certain columns can be of the same data type. For example, column 510 contains only names. Thus, a numeric value, alphanumeric value, etc. cannot be inserted into the cells associated with the column 510. Column 520 is generated to contain only positions' descriptions. This column may be associated with, for example, a closed list of entity positions, for example: chief executive officer (CEO), chief technology officer (CTO), vice president of research and development (VP R&D), and product manager.

The column 530 may be generated to accept only alphanumeric values in a fixed format, such as three letters, a dash and three numbers, e.g., AAA-001. The column 540 may be configured to contain only one of three possible phrases that indicate the status of a certain project such as "working on it", "stuck" and "done". Column 550 is generated to contain only numbers having of 11 letters with a plus symbol in the beginning. This column may be associated with, e.g., international phone numbers of the projects' managers.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for managing permissions of users for a column-oriented data structure, comprising:
   generating a column-oriented data structure in response to receiving a request to generate the column-oriented data structure from a first user device associated with a first user account, wherein the column-oriented data structure includes a plurality of columns, wherein each column is configured to maintain a respective single data type and is assigned metadata associated with the respective single data type;
   associating the first user account with a first set of permissions associated with the generated column-oriented data structure; and
   associating a second user account with a second set of permissions associated with the generated column-oriented data structure, wherein:
     the first set of permissions includes at least one additional permission with respect to the second set of permissions;
     the first set of permissions and the second set of permissions are based on a predetermined association with a type of user account;
     both the first user account and the second user account are enabled to access the column-oriented data structure at the same time, each according to their associated permissions; and
     at least one of the first set of permissions and the second set of permissions is modified based on a data structure type of the generated column-oriented data structure.

2. The method of claim 1, wherein the second user account is associated with a second user device.

3. The method of claim 1, wherein the first set of permissions comprises at least one of: a read command, a write command, a permission to generate a new data structure within a schema, a permission to regenerate the schema, or a permission to edit the schema.

4. The method of claim 1, further comprising:
receiving a request from either a first user account or a second user account to make at least one change in the column-oriented data structure;
determining if the either a first user account or a second user account has a required permission to make the requested change; and
performing the requested change when the either a first user account or a second user is determined to have the required permission.

5. The method of claim 4, wherein determining if the first user account or the second user account has permission to make the requested change is achieved by searching a data repository in which a set of permissions associated with the column-oriented data structure and with various user accounts are stored.

6. A non-transitory computer readable medium having stored thereon instructions for causing a processing circuitry to perform a process, the process comprising:
generating a column-oriented data structure in response to receiving a request to generate the column-oriented data structure from a first user device associated with a first user account, wherein the column-oriented data structure comprises a plurality of columns, wherein each column is configured to maintain a respective single data type and is assigned metadata associated with the respective single data type;
associating the first user account with a first set of permissions associated with the generated column-oriented data structure; and
associating a second user account with a second set of permissions associated with the generated column-oriented data structure, wherein:
the first set of permissions includes at least one additional permission with respect to the second set of permissions;
the first set of permissions and the second set of permissions are based on a predetermined association with a type of user account; and
at least one of the first set of permissions and the second set of permissions is modified based on a data structure type of the generated column-oriented data structure.

7. A system for managing permissions of users for a column-oriented data structure, comprising:
a processing circuitry; and
a memory, the memory containing instructions that, when executed by the processing circuitry, configure the system to:
generate a column-oriented data structure in response to receiving a request to generate the column-oriented data structure from a first user device associated with a first user account, wherein the column-oriented data structure comprises a plurality of columns, wherein each column is configured to maintain a respective single data type and is assigned metadata associated with the respective single data type;
associate the first user account with a first set of permissions associated with the generated column-oriented data structure; and
associate a second user account with a second set of permissions associated with the generated column-oriented data structure, wherein:
the first set of permissions includes at least one additional permission with respect to the second set of permissions;
the first set of permissions and the second set of permissions are based on a predetermined association with a type of user account; and
at least one of the first set of permissions and the second set of permissions is modified based on a data structure type of the generated column-oriented data structure.

8. The system of claim 7, wherein the second user account is associated with a second user device.

9. The system of claim 7, wherein the first set of permissions comprises at least one of: a read command, a write command, a permission to generate a new data structure within a schema, a permission to regenerate the schema, or a permission to edit the schema.

10. The system of claim 1, where the predetermined association is based on a user account email address.

11. The system of claim 7, wherein the system is further configured to:
receive a request from a user account to make at least one change in the column-oriented data structure;
determine if the user account has a required permission to make the requested change; and
perform the requested change when the user account is determined to have the required permission.

12. The system of claim 11, wherein determining if the first user account or the second user account has permission to make the requested change is achieved by searching a data repository in which a set of permissions associated with the column-oriented data structure and with various user accounts are stored.

13. The method of claim 1, wherein the plurality of columns comprise at least a first column of a first single data type and a second column of a second single data type, the first single data type differing from the second single data type.

14. The method of claim 1, wherein the at least one additional permission comprises at least one of: a permission to delete one or more cells, a permission to add a single data type column, a permission to change a column position, a permission to change a cell position, or a permission to add a cell.

15. The method of claim 1, wherein at least one of the plurality of columns is configured to accept only alphanumeric values in a fixed format.

16. The system of claim 7, wherein the plurality of columns comprises at least a first column of a first single data type and a second column of a second single data type, the first single data type differing from the second single data type.

17. The system of claim 7, wherein the at least one additional permission comprises at least one of: a permission to delete one or more cells, a permission to add a single data type column, a permission to change a column position, a permission to change a cell position, or a permission to add a cell.

18. The system of claim 7, wherein at least one of the plurality of columns is configured to accept only alphanumeric values in a fixed format.

19. The method of claim 1, wherein at least one column of the plurality of columns is generated to contain only a description from a closed list of descriptions.

20. The system of claim 7, wherein at least one column of the plurality of columns is generated to contain only a description from a closed list of descriptions.

21. The method of claim 1, wherein the data structure type includes a type of column.

22. The method of claim 21, wherein the data structure type includes a type of row.

* * * * *